(12) United States Patent
Lee

(10) Patent No.: US 6,263,117 B1
(45) Date of Patent: Jul. 17, 2001

(54) AUTOMATIC IMAGE CALIBRATION METHOD FOR A CONTACT TYPE SCANNER

(75) Inventor: Chen-Ho Lee, Yun Lin Hsien (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/170,224

(22) Filed: Oct. 13, 1998

(51) Int. Cl.[7] .................................................. H04N 1/04
(52) U.S. Cl. .......................... 382/254; 358/406; 358/474; 358/494
(58) Field of Search ................................... 358/406, 471, 358/474, 482, 483, 494; 382/184, 254

(56) References Cited

U.S. PATENT DOCUMENTS 4,870,505 * 9/1989 Mitsuki .................................. 358/494
5,117,295 * 5/1992 Smitt ...................................... 358/474

* cited by examiner

*Primary Examiner*—Thomas D. Lee
(74) *Attorney, Agent, or Firm*—McDermott, Will & Emery

(57) ABSTRACT

An automatic image calibration method is provided for a contact type scanner. The inventive method involves in first reading an image of a test chart that consists of at least a horizontal line and a plurality of slanting lines. Then, compute the calibration parameters according to the image of the test chart. The calibration parameters include a vertical displacement value, a horizontal displacement value, and a slope value. After obtaining the calibration parameters for each sensor chip, the initialization step is complete. The calibration parameters must be stored in a memory device for an application program to read. Later on, for each image read by the contact type scanner, the application program can automatically calibrate the image according to the calibration parameters stored in the memory device.

16 Claims, 5 Drawing Sheets

AUTOMATIC IMAGE CALIBRATION METHOD FOR A CONTACT TYPE SCANNER

BACKGROUND OF THE INVENTION

A. Field of the Invention

The present invention relates to an image calibration method for a contact type scanner, especially to an automatic image calibration method that solves the problems of missing line or skew image occurred when the sensor chips of the contact image sensor are not in alignment.

B. Description of the Prior Art

A conventional contact image sensor module (hereinafter referred to as CIS module) consists of multiple sensor chips that are perfectly aligned in a bar-shape module without any space therebetween. For instance, a 600 dpi CIS module usually consists of 15 sensor chips. And each sensor chip can read 340 pixels. These sensor chips in the CIS module shall be in perfect alignment as illustrated in FIG. 1A. Accordingly, the image of a test chart read by these sensor chips will look like the image as illustrated in FIG. 2A. However, when the sensor chips are not well-aligned during assemble, the phenomena of missing lines or skew images may occur as illustrated in FIGS. 1B~1D. FIGS. 1B~1C illustrate the situations when the sensor chips are not well-aligned in a vertical direction. On the other hand, FIG. 1D shows the situation when the sensor chips are not tightly connected together in a horizontal direction.

As illustrated in FIGS. 1B~1C, when the sensor chips are not well-aligned in the vertical direction, the skew pixels can be detected from the horizontal lines or the slanting lines of the image of the test chart. On the other hand, when there is space between two neighboring sensor chips as illustrated in FIG. 1D, missing lines or pixels may be detectable from the edges of the slanting lines. In FIG. 2D, the missing pixels X, Y indicate the location where the sensor chips are not connected together tightly.

Although the quality of CIS modules from CIS manufactures is not always defected, a small or even invisible displacement of these sensor chips may affect the quality of images a lot. That explains why the image quality of the contact type scanners cannot be guaranteed. This has long been a problem for the scanner manufacturers because they have no control on the products what are from the third party.

SUMMARY OF THE INVENTION

Accordingly, it is an object of the present invention to provide an automatic image calibration method that can calibrate various image problems caused by mal-aligned sensor chips based on three calibration parameters namely, a vertical displacement value, a horizontal displacement value, and a slope value.

It is another object of the present invention to provide an automatic image calibration method that provides the functions of fast image calibration and fine-tune image calibration, thereby a user can choose a function depending on the desired quality of images.

It is a further object of the present invention to provide an automatic image calibration method that is adaptable to various contact type scanners without having to digging out their possible hardware problems.

Accordingly, the computation of the calibration parameters can be implemented as an application program and executed in a personal computer. The application program is adaptable to various contact type scanners. At the step of system initiation, the inventive method involves in obtaining the calibration parameters for the contact type scanner being initialized. First, the application program reads the image of a test chart on the contact type scanner to compute the vertical displacement value, the horizontal displacement value, and the slope value for the contact type scanner. After the computation is finished, the calibration parameters will be stored in a memory which can be in the contact type scanner or in a host computer. After initialization, the application program can read and calibrate any image according to the calibration parameters stored in the memory.

The steps of computing the calibration parameters comprise: first, rotate the entire image to the same horizontal line based on the first pixel of the first sensor chip and the last pixel of the last sensor chip in the CIS module. Then, for each sensor chip, computing its vertical displacement value by subtracting the Y coordinate of the last pixel of the first sensor chip from the Y coordinate of the first pixel of the ith sensor chip. The vertical displacement value for each sensor chip indicates the sequence for an application program to read the image from a buffer. Thus, the vertical displacement value can eliminate skew images.

Then, based on the rotated image, for each sensor chip, computing its horizontal displacement value to its previous sensor chip by detecting and counting the number of missing pixels from the gray-levels variation of the slanting lines on the test chart. For each horizontal displacement value not equal to zero, fill in new pixels by the average value of the gray levels of the pixels neighboring to the missing pixels. The horizontal displacement value can eliminate the phenomena of missing lines occurred in an image.

The above mentioned calibration method can do coarse calibration at a fast speed. Nevertheless, for a high requirement of image quality, the slope value for each pixel must be computed. For each sensor chip, first compute its slope value by subtracting the Y coordinate of its first pixel from the Y coordinate of its last pixel. Then, after computing the slope value for each sensor chip, we can easily compute the slope value for each pixel by dividing each slope value by the number of pixels for each sensor chip. And then, we can calibrate each pixel of the sensor chip according to its slope value. This fine-tune calibration may take a longer time but with a best quality.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

Figure 1A:
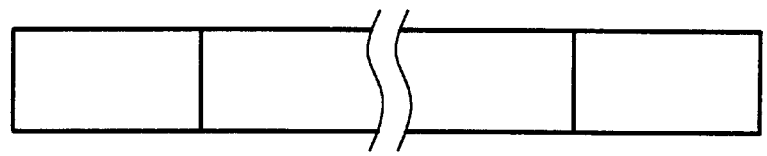
FIGS. 1A~1D are schematic diagrams showing various situations when the sensor chips are assembled in a CIS module.
Figure 1B:
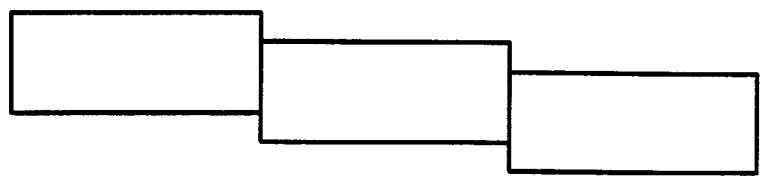
Figure 1C:
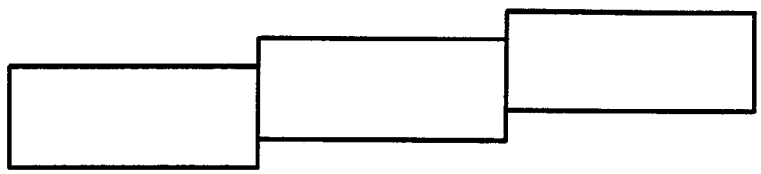
Figure 1D:
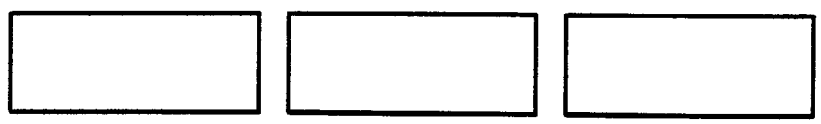
Figure 2A:
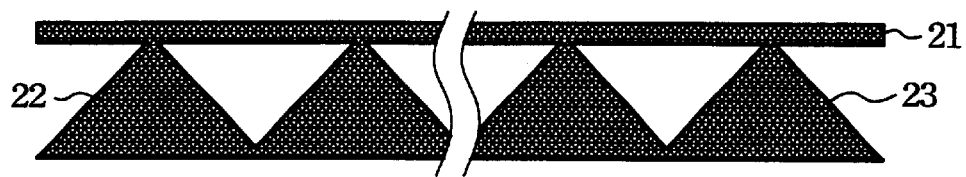
FIGS. 2A~2D are schematic diagrams showing the images generated by various CIS modules as illustrated in FIGS. 1A~1D respectively.
Figure 2B:
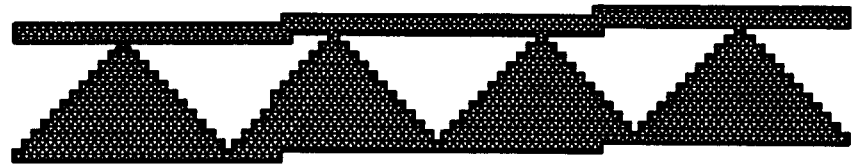
Figure 2C:
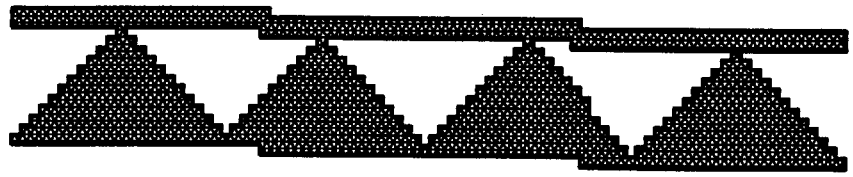

To detect various situations of displacement for the sensor chips, the present invention uses a test chart with horizontal lines and slanting lines as illustrated in FIG. 2A. Refer to FIG. 2A, the test chart consists of a horizontal bar-line 21 of black level and a number of slanting lines 22, 23 distributed uniformly in horizontal direction on the test chart. If the displacement of a sensor chip is in vertical direction, as illustrated in FIGS. 1B, and 1C, then the displacement of the pixels can be detected from the edge of the horizontal bar-line 21 as well as the slanting lines 22, 23. On the other hand, if the displacement of the sensor chip is in horizontal direction, as illustrated in FIG. 1D, then the displacement of the pixels can be detected from the pixels at the edges of the slanting lines 22, 23. Consequently, the test chart with patterns of different slopes can help to detect possible situations of the sensor chips in the CIS module.

According to the preferred embodiment of the present invention, the test chart is attached to one end of the document tray so that the CIS module can read the test chart at the time of system initialization. When a computer program is adapted to a contact type scanner for initialization, it will read the calibration parameters for the contact type scanner. The calibration parameters will then be stored in a memory location which may be a memory device in a host computer or in the contact type scanner. Later on, whenever the contact type scanner reads an image from a document, it can automatically calibrate the image according to the calibration parameters stored in the memory location. Moreover, a user can choose to perform a coarse calibration or a fine-tune calibration. A coarse calibration can calibrate an image at a fast speed based on vertical and horizontal displacement values only. On the other hand, a fine-tune calibration which is based on a slope value can calibrate an image in a high quality but at relatively slow speed.

Figure 3A:
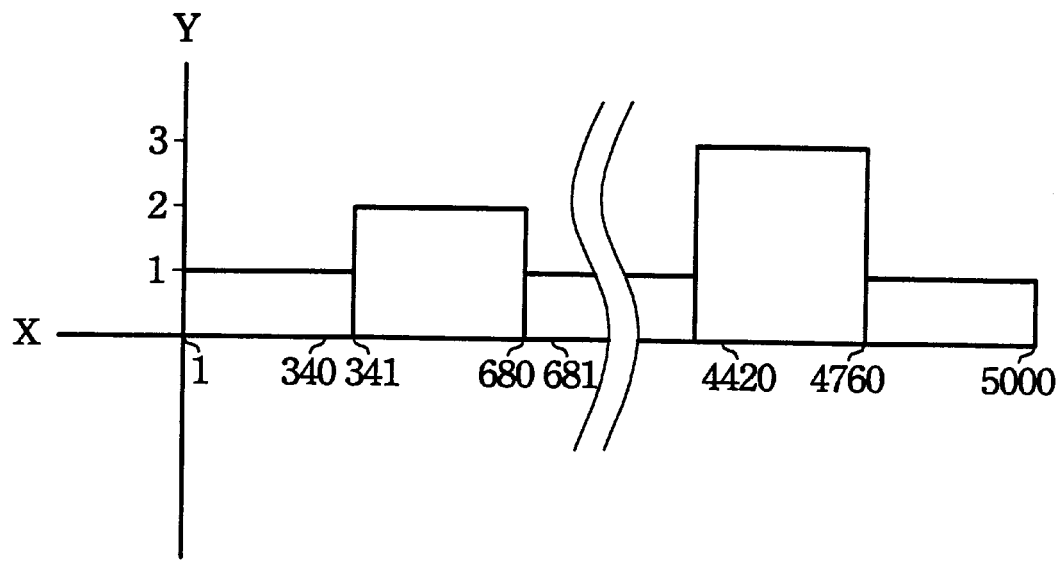
FIG. 3A is a schematic diagram showing the method of the present invention for detecting the vertical displacement value for each sensor chip in a CIS module.

Accordingly, the automatic calibration method involves in computing the vertical displacement value, the horizontal displacement value and the slope value for each sensor chip according to the method of the present invention. Refer to FIG. 3A (X not in proportional to Y) for the method of computing a vertical displacement value. Take a 600 dpi CIS module for an example. It consists of 15 sensor chips. And each sensor chip can read 340 pixels. From the number of pixels read by each sensor chip, we can easily tell the starting position and the ending position for each sensor chip based on their coordinates. To obtain a normal coordination of the entire image, we have to rotate the entire image on the same horizontal line based on the first pixel of the first sensor chip and the last pixel of the last sensor chip, as illustrated in FIG. 3A. Then, the vertical displacement value for each sensor chip to the first sensor chip can be precisely computed.

Figure 4:
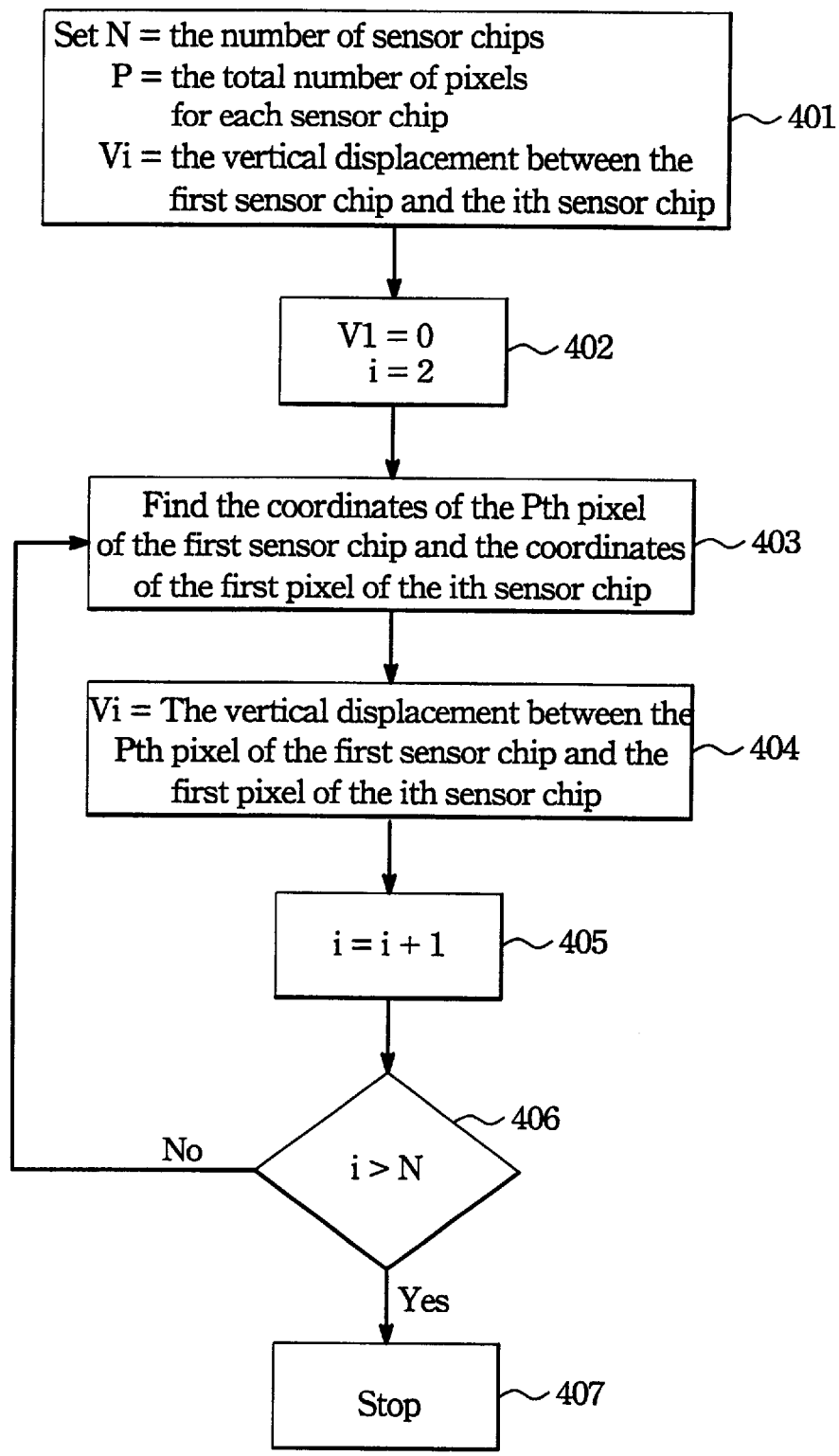
FIG. 4 is a flow chart showing the inventive method for computing the vertical displacement value for each sensor chip.

Refer to FIG. 4 for the detailed flow chart for computing each vertical displacement value. At step 401, first initialize several parameters and variables. Let N=the total number of sensor chips, P=the total number of pixels for each sensor chip, $V_i$=the vertical displacement between the first sensor chip and the ith sensor chip. At step 402, initialize the indices and set $V_1$=0; and i=2. Since each sensor chip is to be compared with the first sensor chip, so the starting sensor chip shall be the second one. At step 403, find the coordinates of the pth pixel of the ith sensor chip and the coordinates of the first pixel of the first sensor chip. The coordinates of these pixels can be found based on their gray levels. At step 404, subtract the Y coordinate of the pth pixel of the first sensor chip from the Y coordinate of the first pixel of the ith sensor chip to get the vertical displacement value of $V_i$. At step 405, increase the index i by one to detect the vertical displacement value for next sensor chip. At step 406, determine if i is larger than N? If yes, that means the vertical displacement value for each sensor chip has been found, so go to step 407 to stop. If not, go to step 403 to continue.

Figure 3B:
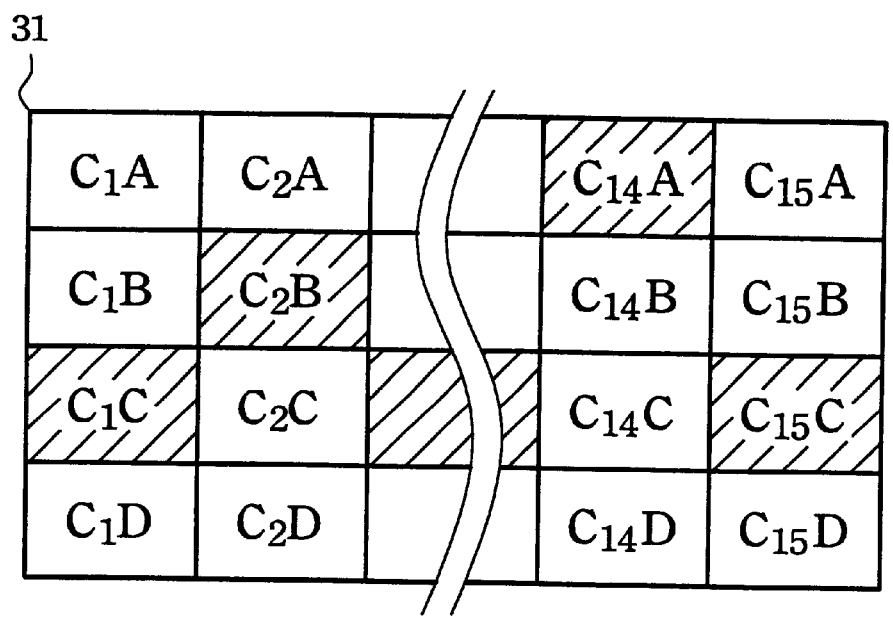
FIG. 3B is a schematic diagram showing the order of reading images according to the vertical displacement value computed according to the method illustrated in FIG. 3A.

After the vertical displacement value for each sensor chip is obtained, we can use the vertical displacement value $V_i$ to calibrate each image read by the CIS module. Take FIG. 3A for an example in which all other vertical displacement values are zero except $V_2$=−1 and $V_{14}$=−2. The vertical displacement values also indicate the reading sequence for an application program to access image data in a buffer or memory. Refer to FIG. 3B, a buffer 31 interfacing an application program and the CIS module can store 4 image stripes at one time. The image will be sent to an application program to be further processed. The buffer 31 consists of many memory sections for storing the image data of each sensor chip in order. In the buffer 31, $C_1$ represents the first sensor chip and $C_2$ the second sensor chip, and so on. The 4 image stripes are indicated by A, B, C, and D respectively. And the size of the buffer depends on application.

According to the vertical displacement values obtained, an application program will read the data stored in the buffer 31 in a sequence as shaded in FIG. 3B. The first image stripe to be read shall be $C_1C$, $C_2B$, $C_3C$~$C_{13}C$, $C_{14}A$ and $C_{15}C$. And then, the second image stripe shall be $C_1D$, $C_2C$, $C_3D$~$C_{13}D$, $C_{14}B$ and $C_{15}D$. The rest will be discarded. The sequence remains the same for the image data subsequently stored in the buffer 31.

Figure 2D:
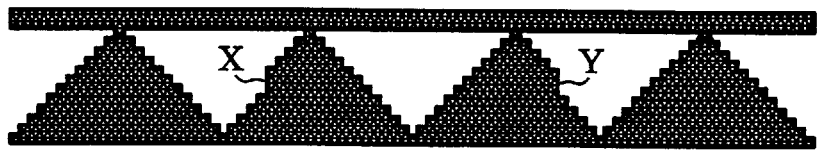
Figure 5A:
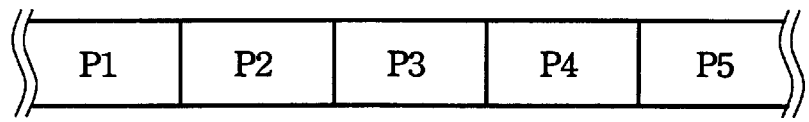
FIG. 5A is a schematic diagram showing the inventive method for computing the horizontal displacement value for each sensor chip.
Figure 5B:
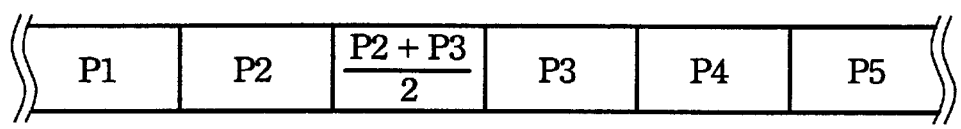
FIG. 5B is a schematic diagram showing the method of filling in new pixels according to the present invention.

Next, the method of computing the horizontal displacement value is illustrated in FIG. 5A and FIG. 5B. Recall that an image read by a CIS module with horizontal displacement between sensor chips will be like the image as illustrated in FIG. 2D. The missing pixels indicated by X and Y represent the locations where the sensor chips are not tightly connected. Refer to FIG. 5A, it shows the pixels where there is a missing pixel right after P2. Suppose the number of missing pixels and their locations have been found using conventional gray level comparison, and we know that there is a missing pixel right after P2. Then, we will fill in a new pixel right after P2 using the average gray levels of P2 and P3. The pixels P3, P4, and P5 will be right shifted as illustrated in FIG. 5B. Suppose P5 falls out of the range, so P5 will be discarded in this case.

Basically, the vertical displacement value and the horizontal displacement value are for coarse calibration. In most cases, the coarse calibration is efficient and sufficient enough for most CIS modules. After all, if the quality of the CIS module is so bad, it shall be returned to the manufacturer. However, if a user requires an image of very high quality, then we have to further compute the slope value for each pixel so that the fidelity of the image can be completely restored.

Figure 6:
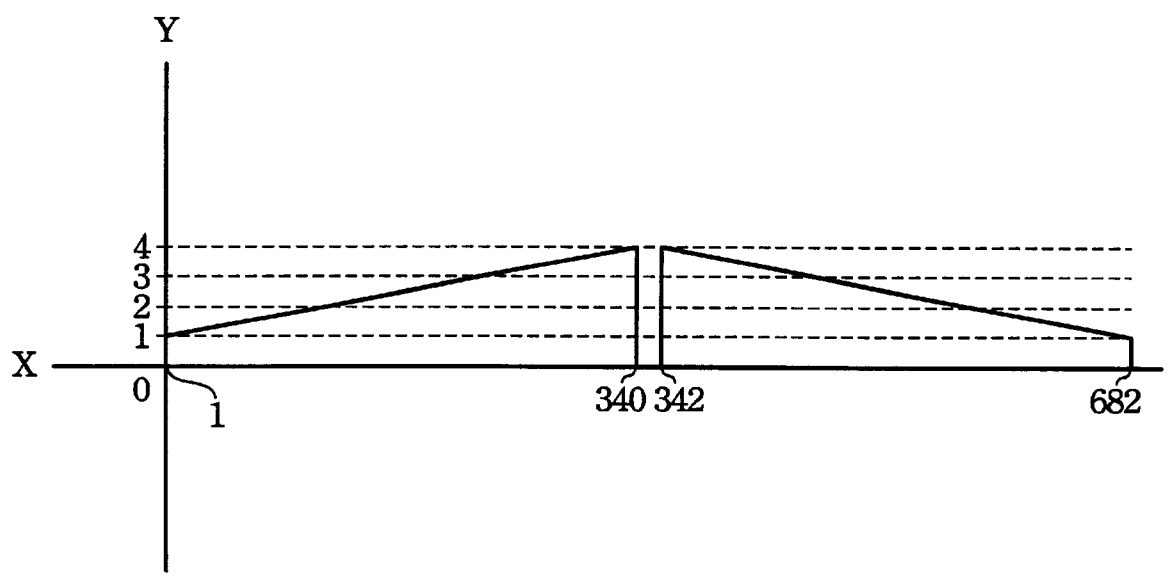
FIG. 6 is a schematic diagram showing the method of computing the slope value for each pixel according to the present invention.

Take the image as illustrated in FIG. 6 for an example (X not in proportion to Y). It shows two sensor chips have vertical displacement as well as horizontal displacement. The slop of the left sensor chip is +3 pixels while the slope for the right sensor chip is −3 pixels. Since each sensor chip has 340 pixels. The average slop for each pixel in the left sensor chip will be 3/(340−1). The slope value for each pixel will be 3/339. Accordingly, the slope value for the nth pixel $P_n$ can be obtained based on the equation where $P_n=3\times(n-1)/339$. So, the slope value for the first, the second, and the third . . . pixels shall be 0, 3/339, 6,/339 . . . respectively. To calibrate the image, each pixel must be computed according to its slope value. That is, the application program will read the image according to its vertical displacement value as described in FIG. 3A and FIG. 3B. Then, each pixel read by such a sequence will be further calibrated according to its slope value. The computation of the slope value for the right sensor chip is the same only that it is right inclining.

The case shown in FIG. 6 is more complicated because it indicates there are two pixels missing between the right and the left sensor chips. So, after reading the image and calibrating each pixel according to its slope value, we have to fill in the location where missing pixels occurred by the average gray levels of their neighboring pixels.

To sum up, the method described above for computing the vertical and horizontal displacement values and also the slope values can be implemented in a computer program. When a CIS scanner is initialized for the first time, the computer program can compute these calibration parameters by reading the image of the test chart according to the preferred embodiment of the present invention. The calibration parameters will be stored in a memory device so that each image read can be calibrated according to these calibration parameters. Furthermore, a user is free to choose a coarse calibration or a fine-tune calibration based on the image quality required. The most important contribution for the present invention is that it can efficiently improve the image quality of contact type scanners in a simple manner without being restricted by the quality of CIS modules. Besides, the software implementation is relatively cheap and easy to be adapted to any model of contact type scanner.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. An automatic calibration method for a contact type scanner, said contact type scanner having a contact image sensor (CIS) module formed by a plurality of sensor chips for reading image information, comprising the steps of:

reading an image of a test chart having at least a horizontal line and a plurality of slanting lines extending along said horizontal line;

computing at least a horizontal displacement value and a vertical displacement value for each of said plurality of sensor chips according to said image of said test chart;

storing said horizontal displacement value and said vertical displacement value for each of said plurality of sensor chips; and calibrating each image read by said contact type scanner according to said stored horizontal displacement value and said vertical displacement value for each of said plurality of sensor chips.

2. The method as claimed in claim 1, further comprising the step of:

computing a slope value for each of said plurality of sensor chips.

3. The method as claimed in claim 2, wherein said slope value is obtained by the steps of:

obtaining a slope value of a sensor chip by computing a vertical distance between the first pixel of said sensor chip and the last pixel of said sensor chip; and dividing said slope value of said sensor chip by the number of pixels read by said sensor chip.

4. The method as claimed in claim 2, further comprising:

storing said slope value for an associated pixel read by said CIS module; and calibrating each pixel according to said associated slope value.

5. The method as claimed in claim 1, wherein said vertical displacement value is obtained by the steps of:

rotating the first pixel and the last pixel of said image of said test chart to the same horizontal position; and obtaining said vertical displacement value of each of said plurality of sensor chips by computing a vertical distance between the last pixel of the first sensor chip and the first pixel of each of said plurality of sensor chips.

6. The method as claimed in claim 1, further comprising the step of:

storing a predetermined number of image strips in memory means.

7. The method as claimed in claim 6, further comprising the steps of:

reading said predetermined number of image strips in a sequence according to said vertical displacement value for each of said plurality of sensor chips; and inserting new pixels into the positions of said missing pixels when said horizontal displacement value is not equal to zero.

8. The method as claimed in claim 7, wherein the gray levels of said new pixels are based on the average gray levels of their neighboring pixels.

9. The method as claimed in claim 1, wherein said horizontal displacement value is obtained by the step of:

determining the positions and number of missing pixels according to the gray levels on the edges of said plurality of slanting lines of said test chart.

10. The method as claimed in claim 1, wherein said step of computing and said step of calibrating can be implemented in a computer program.

11. An automatic image calibration method for a contact type scanner, said contact type scanner having a contact type sensor (CIS) module formed by a plurality of sensor chips for reading image information, comprising the steps of:

reading an image of a test chart having at least a horizontal solid line and a plurality of slanting lines extending along said horizontal solid line;

rotating the first pixel and the last pixel of the image of said test chart to the same horizontal position;

obtaining a vertical displacement value of each of said plurality of sensor chips by computing a vertical distance between the last pixel of the first sensor chip and the first pixel of each of said plurality of sensor chips;

obtaining a horizontal displacement value by determining the positions and number of missing pixels according to the gray levels on the edges of said plurality of slanting lines of said test chart;

storing said vertical displacement value and said horizontal displacement value;

reading an image in a sequence according to said vertical displacement value; and inserting new pixels into said positions of said missing pixels when said horizontal displacement value is not equal to zero.

12. The method as claimed in claim 11, further comprising the steps of:

storing a predetermined number of image strips in memory means.

13. The method as claimed in claim 11, further comprising the steps of:

computing a slope value of a sensor chip by computing a vertical distance between the first pixel of said sensor chip and the last pixel of said sensor chip;

dividing said slope value of said sensor chip by the number of pixels read by said sensor chip;

storing said slope value for an associated pixel read by said CIS module; and calibrating each pixel according to said associated slope value.

14. An automatic image calibration method for a contact type scanner, said contact type scanner having a contact image sensor (CIS) module formed by a plurality of sensor chips for reading image information, comprising the steps of:

reading an image of a test chart having at least a horizontal solid line and a plurality of slanting lines extending along said horizontal solid line;

rotating the first pixel and the last pixel of the image of said test chart to the same horizontal position;

obtaining a horizontal displacement value by determining the positions and number of missing pixels according to the gray levels on the edges of said plurality of slanting lines of said test chart; and storing said positions of said missing pixels in memory means when said horizontal displacement value is not equal to zero.

15. The method as claimed in claim 14, further comprising the steps of:

reading an image; and inserting new pixels into said image according to said positions of said missing pixels when said horizontal displacement value is not equal to zero.

16. The method as claimed in claim 14, wherein the gray levels of said new pixels are based on the average gray levels of their neighboring pixels.

* * * * *